United States Patent [19]

Lovette, Jr. et al.

[11] 4,324,110
[45] Apr. 13, 1982

[54] SPIRAL-TYPE HEAT EXCHANGER

[75] Inventors: Norris G. Lovette, Jr., Breinigsville; David R. Ruprecht, Laurys Station, both of Pa.

[73] Assignee: Air Products and Chemicals, Inc., Allentown, Pa.

[21] Appl. No.: 199,130

[22] Filed: Oct. 22, 1980

[51] Int. Cl.$^3$ ............................................. F25D 25/02
[52] U.S. Cl. .......................................... 62/381; 62/63
[58] Field of Search .................................... 62/63, 381

[56] References Cited

U.S. PATENT DOCUMENTS

| | | | |
|---|---|---|---|
| 3,348,659 | 10/1967 | Roinestad | 198/778 |
| 3,638,451 | 2/1972 | Brandt | 62/381 |
| 3,733,848 | 5/1973 | Duron et al. | 62/381 |
| 3,866,432 | 2/1975 | Harrison | 62/381 |
| 4,023,381 | 5/1977 | Onodera | 62/381 |
| 4,056,950 | 11/1977 | Kaufman, Jr. | 62/381 |

OTHER PUBLICATIONS

"Ashworth Lotension Spiralcage System" described in Ashworth Bulletin No. 071 (1970) pp. 10–11.

Primary Examiner—Ronald C. Capossela
Attorney, Agent, or Firm—Richard A. Dannells, Jr.; E. Eugene Innis; James C. Simmons

[57] ABSTRACT

A system for heating or cooling articles conveyed in a vertical helical path is defined by an endless conveyor belt driven at its inner edge by contact with a rotating drum and a circulating heat exchange fluid propelled horizontally onto the articles by axial flow fans rotating in a vertical plane. The system features a novel arrangement employing scroll means for confining the circulating heat exchange fluid to a substantial portion of the helical path and location of fan means such that the heat exchange fluid is propelled in push-pull manner from the discharge side of one fan means to the intake or suction side of a second fan means. In the preferred embodiment directed to refrigeration of conveyed articles, more particularly foodstuffs to be frozen, the conveyor is located within an insulating housing. Further featured novelty includes location of the driving means for the rotating drum externally of the housing and directing of refrigerant, such as liquid $CO_2$ into the fan blast in a direction counter to that of the blast.

3 Claims, 4 Drawing Figures

SPIRAL-TYPE HEAT EXCHANGER

The present invention relates to systems for heating or cooling articles while being conveyed through a heat exchange enclosure. It is particularly concerned with such systems employing a conveyor for such articles traversing a spiral path within such enclosure.

BACKGROUND OF THE INVENTION

Spiral conveyor systems employing an endless belt conveyor travelling around the periphery of a vertically mounted cage or drum have been commercially employed for heating or cooling various products. Such a system for fast freezing of food products, for example, is disclosed in U.S. Pat. No. 3,733,848, wherein the products are passed in a vertical helical path within an insulated housing and are contacted with cold $CO_2$ gas blown generally tangentially across the conveyor flights.

Among the known spiral conveyor types that have been employed in such heating and/or cooling systems are those disclosed in U.S. Pat. No. 3,348,659 and other patents assigned to Ashworth Bros., Inc. One such commercial system widely known in the industry is the "Ashworth Lotension Spiralcage System", described in Ashworth Bulletin No. 071 (1970).

SUMMARY OF THE INVENTION

Among the objects of the present invention is to provide a novel heat exchanger system affording greater thermal efficiency for heating or cooling articles traversing an essentially helical vertical path. This is accomplished, in accordance with the invention, by utilization of fans arranged in a push-pull manner for propelling of heating or cooling fluid across the product being treated and the provision of a scroll case design to reduce the cross-sectional area of the gas flow path, thereby decreasing the volume of gas which need be circulated to achieve the desired velocity across the product and thereby conserving the velocity energy of the gas stream.

In accordance with a preferred embodiment of the invention, but not restricted thereto, the novel system is utilized for refrigeration, particularly in rapid freezing of food products carried on the conveyor traversing a vertical helical path, wherein a cold gas is blown across the conveyed products by fans and the temperature of circulating heat exchanger fluid is regulated by injection of liquid $CO_2$ or liquid nitrogen into the path of the moving gas stream. In the case of using $CO_2$ as the refrigerant, the system of the invention is effective in reducing or eliminating solid $CO_2$ build-up otherwise normally present at the lower, more desirable operating temperatures. Thus, the transfer of heat from the recirculating gas to the potentially solid $CO_2$ is improved by confining the circulating gas to an essentially well defined circuit allowing the liquid $CO_2$ refrigerant to be injected at the proper gas temperature point in this circuit, where the gas/solid temperature difference is high enough to completely sublime the nucleate snow. In the case of other refrigerants, such as liquid nitrogen for example, the arrangement of the fans and the essentially confined path obtained by the scroll arrangement lead to more efficient vaporization of the injected liquid refrigerant.

Further control over $CO_2$ snow sublimation or rapid vaporization of other injected liquid refrigerant is achieved by locating the points of injection directly in the recirculating gas stream; the points of injection being positioned such that the direction of the jet of refrigerant is against the direction of the circulating gas stream. In the case of liquid $CO_2$ injection such arrangement strips the nucleate snow particles of the accompanying cold-gas envelope, exposing them to the warmer circulating gas stream before they coalesce into larger particles with lower surface to volume ratios.

The system in accordance with the invention utilizes at least two axial flow fan means rotating in substantially vertical planes for circulating heat exchange fluid in a substantially horizontal flow path across the product being moved in a vertical helical path by an endless belt conveyor. Scroll means are provided along the outer periphery of the conveyor to define the path of the heat exchange fluid substantially coincident with the helical path of the conveyor, and the several fans are so arranged with respect to one another such that the propulsion of one of said fan means drives the circulating heat exchange fluid along the conveyor path to a position where the negative pressure of the intake of a companion fan exists.

DESCRIPTION OF PREFERRED EMBODIMENT

Figure 1:
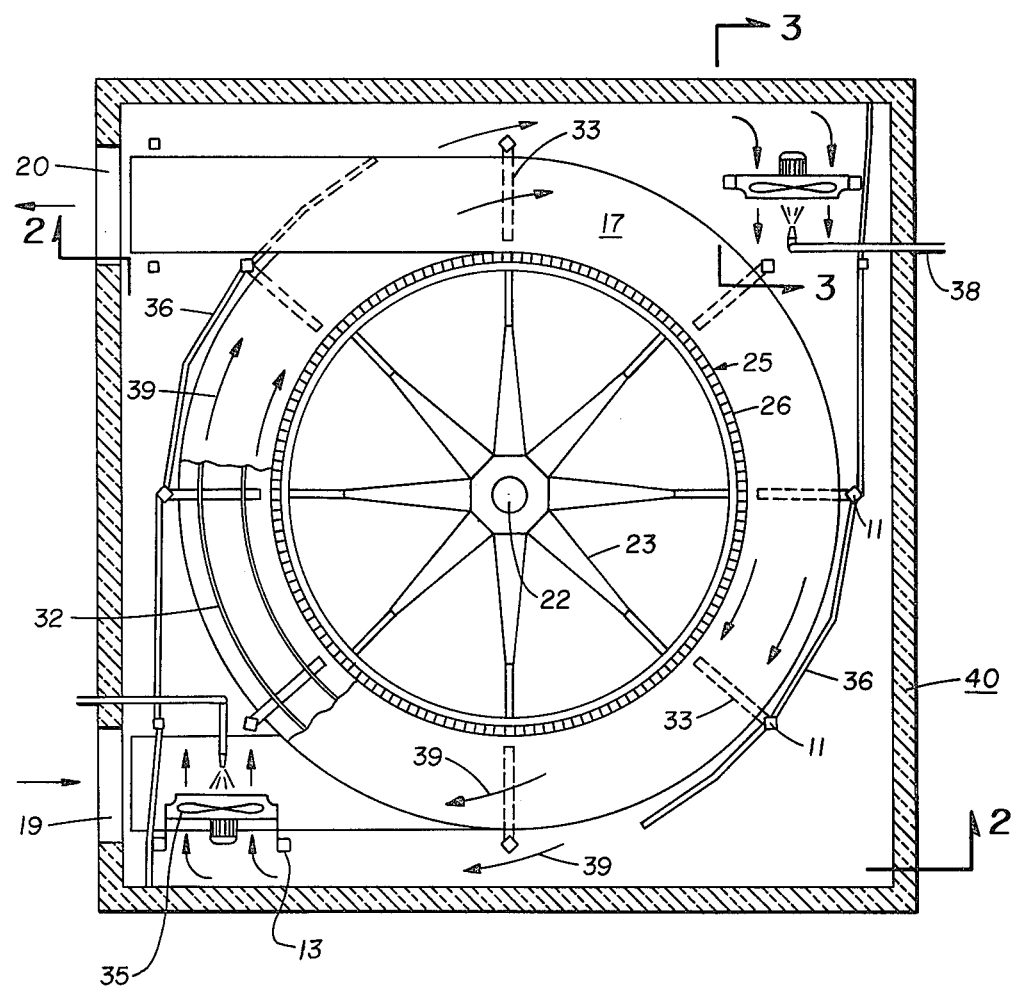
FIG. 1 is a partially schematic plan view taken along the line 1—1 of FIG. 2, with a portion broken away.
Figure 2:
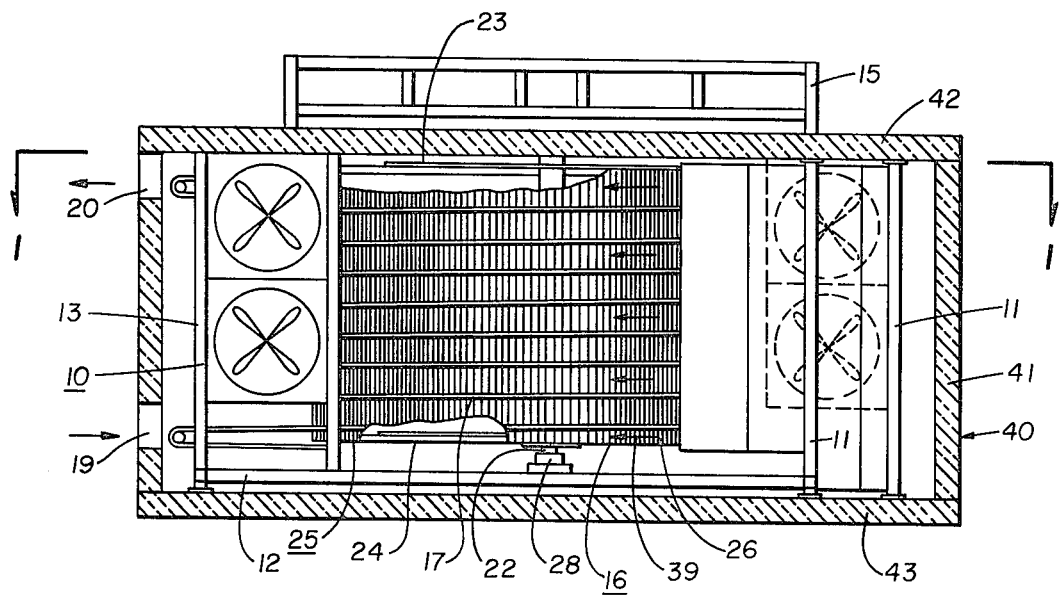
FIG. 2 is a vertical elevation, partly in section taken along line 2—2 of FIG. 1.

Referring now to FIGS. 1 and 2 of the drawings, there is depicted a supporting structure 10 comprising a plurality of spaced uprights 11 rigidly affixed to bottom member 12 and supplementary supports 13. Superimposed on the supporting structure 10, by rigid attachment thereto or integral therewith is a superstructural framework 15. A rotatable cage or drum 16 is located within the supporting structure, said cage or drum serving as driving means for a multiple tier belt conveyor 17, the inner edges of which are in sliding frictional engagement with the periphery of the drum to form a vertical helix around the drum (FIG. 4) providing a continuous conveyor passage between its lower flight level and its upper flight level, in the selected direction of movement of the conveyor between a feed station and an outlet or discharge station. In the embodiment depicted, the conveyor is driven by the drum to move helically upwardly from the feed station 19 to the discharge station 20. However, the functions of these stations can be reversed.

The cage or drum 16 is defined by a central drive shaft 22, upper and lower spider members 23 and 24 rigidly affixed to said shaft, and a peripheral wall 25, formed by spaced vertical bars 26 which frictionally engage the inner edges of belt 17. The upper end of shaft 22 is journaled in and supported from a heavy duty radial-thrust bearing 27 (FIG. 4) suitably mounted within the superstructure, and the lower end of the shaft is journaled in a radial bearing 28 mounted on the bottom member 12 of the supporting structure. Where the device is to be employed for refrigeration of products conveyed on the belt, the lower radial bearing should be of the self-lubricating type, capable of withstanding cryogenic temperatures. While the vertical bars 26 are shown as rectangular in cross-section, bars of circular or other cross-section may be employed.

Figure 4:
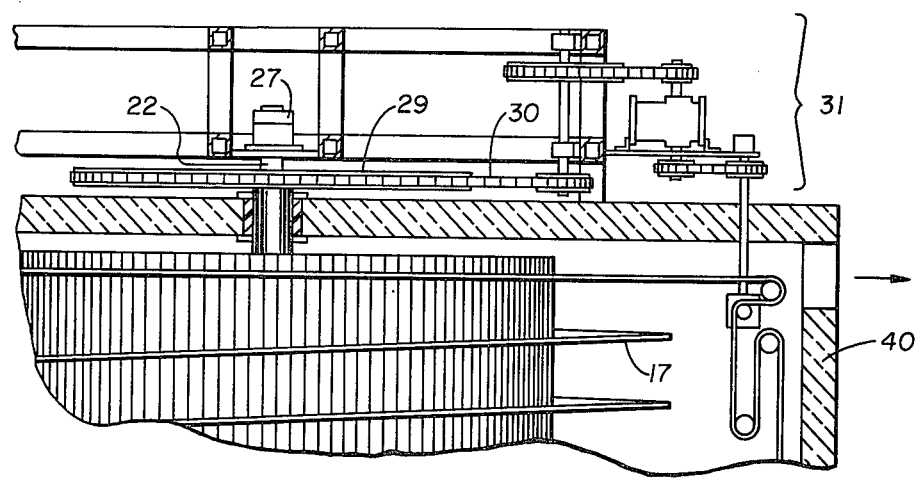
FIG. 4 is an enlarged partial vertical section showing the driving means for the drum or cage.

The cage or drum is driven by a sprocket 29 mounted approximately at the upper end of shaft 22, the sprocket being connected through a driving chain 30 and suitable gearing 31 to a prime mover (FIG. 4). The rigidity and stability of the drum or cage 16 may be reinforced by supplemental internal supports (not shown).

A belt supporting rack 32 is supported on cantilever support members 33 circumferentially arranged to extend radially inward from the uprights 11 at vertically spaced levels. Rack 32 thereby forms a helical trackway for belt 17 during its travel around drum 16. To reduce friction and wear, the belt rack 32 may be provided with a low friction surface, such as ultra high molecular weight polyethylene or the like, to slidably contact the lower surface of the moving belt. Any form of flat belt may be employed for the conveyor 17, made up of a plurality of links collapsibly connected together to permit the belt to bend in an edgewise direction around the circumferential periphery of the drum. One form of such belt is disclosed in U.S. Pat. No. 2,872,023. Stainless steel conveyor belts suitable for this embodiment of the present invention are commercially available under the Ashworth designations Omniflex ® and Omnigrid ®.

Figure 3:
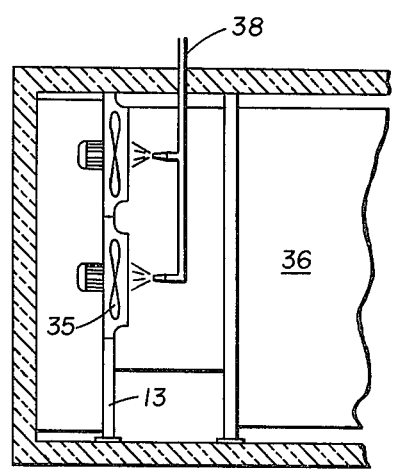
FIG. 3 is a partial horizontal section taken along line 3—3 of FIG. 1.

An important feature of the present invention is the novel arrangement of the means for circulating a heat exchange fluid across the products carried on the helical conveyor and for limiting the path of flow of such fluid. As is depicted particularly in FIGS. 1 and 3 of the drawings, a plurality of axial flow fans 35, each having a substantially vertical plane of rotation, are mounted to extend inwardly from the outer uprights 13. While in the specific embodiment illustrated two banks of two such fans are shown, it will be understood that a larger number of such fans may be employed, depending among other considerations upon the number of flights of the conveyor and the extent of heat exchange required; at least two such fans being needed to carry out the designed novel push-pull operation in accordance with the invention. Each pair of fans is arranged to propel the circulated heat exchange fluid in the path of travel of the conveyor belt and such that the circulating fluid flows along a portion of the helical path of the belt from the discharge of the one fan of the pair to at least a position where the negative pressure of the suction of the second fan of the pair exists. The circulating gas stream may be caused to flow concurrently or counter to the direction of travel of the conveyor. To confine the path of movement of the circulating heat exchange fluid within a defined circuit, a scroll case 36 is provided around a major portion of the periphery of the external edge of the belt. While in the illustrated embodiment, one pair of cooperating fans is shown at each level of the fan bank, a larger number of such pairs may be used at each level, arranged in push-pull relation such that the heat exchange fluid is propelled along the helical path of the belt, from the exhaust outlet of one fan to the intake of a companion fan.

Where the heat exchange system is to be employed for refrigeration of products carried on the belt, as for example for freezing of food products, means are provided for the introduction of the heat exchange fluid into the path of the conveyor movement. As shown in FIGS. 1 and 3 of the drawings, there is provided at 38 a system for injection of a cold fluid or refrigerant, such as liquid $CO_2$ or liquid nitrogen, into the moving fluid stream circulated by the fans. In the preferred arrangement the liquid refrigerant is injected at least at each fan location and in a direction such that the jet of fluid is directed into and counter to the blast of the fan, thereby effecting rapid vaporization of the refrigerant and in the case of liquid $CO_2$ assisting in elimination or reduction of the build-up of solid $CO_2$. In addition to the location of the refrigerant injection points adjacent the fan discharge stations, any desired number of supplementary injection nozzles (not shown) may be provided circumferentially spaced at one or more levels. In the case of $CO_2$, the refrigerant is advantageously injected in a direction counter to the direction of bulk flow of the circulating fluid indicated by arrows 39.

Where the system is to be employed for heating of products carried on the helical conveyor provision for injection of heat exchange fluid is not required; instead a heating coil or other heating means may be provided adjacent the discharge sides of the fans and along the helical path between the conveyor flights, to heat the existing circulating air stream.

In instances in which the system is to be employed for refrigeration of articles carried on the conveyor, the supporting structure and the rotating cage or drum are enclosed within an insulated housing 40 comprised of a peripheral wall 41 and top and bottom closure members 42 and 43, preferably in hermetically sealed relation. The insulated housing may be formed of spaced metallic sheets containing therebetween suitable insulating material such as cellular polyurethane.

An additional feature of the present invention in its preferred embodiment is the location of the driving means for the cage or drum outside of the insulated housing, thereby avoiding the difficulties otherwise encountered in previous refrigeration installations of this type. Thus, as shown in the illustrated embodiment, (FIG. 4), the drive shaft 22 is suspended by the heavy duty radial-thrust bearing 27 which is located external to the cold environment existing within the insulated enclosure 40, and can be readily lubricated as needed. No end thrust is imposed on the lower radial bearing 28, so that a simple self-lubricating bearing can here be safely employed, capable of withstanding cryogenic or other extreme temperatures. Moreover, the driving means for the shaft being located external to the cold environment, such means are not subjected to the drastic temperature conditions otherwise existing within the insulated housing, adversely affecting moving mechanical parts when therein located. Among the important advantages of the external drive location are:

1. Drive components are not subjected to extreme temperatures; reducing component cost and increasing life:
   (a) Heavily loaded rotating frictional parts requiring efficient lubrication are located outside the extreme environment where the most efficient lubricants can be employed. There are no efficient lubricants for −60° F. or below that are approved by the U.S.D.A. for incidental food contact. Most lubricants, especially U.S.D.A. approved, edible lubricants, are adversely affected by sanitary washdowns.
   (b) Drive components are not subjected to sanitation cleaning procedures and chemicals commonly used in the food industry and can thus be built of the more commonly used materials such as steel and aluminum, brass, and the like, rather than stainless steels, epoxy coatings, or other exotic materials.

(c) Drive components are not subjected to thermal cycling due to extreme temperature variations commonly experienced by components designed for the extreme temperature environment and can thus be designed with closer, more efficient tolerances resulting in longer life and greater reliability.

2. Drive component maintenance time and cost is reduced; maintenance personnel do not have to work in the extreme environment or space limitations necessary with other arrangements.

To minimize outflow of cold from within housing 40, a low temperature gas seal may be provided at the place where driving shaft 22 passes through insulated top 42 of housing 40. Similar seals may be provided at the places where the upright members pass through the insulated housing. These low temperature gas seals may be formed of Teflon or other known low temperature resistant materials.

By confining the path of flow of the heat exchange fluid in accordance with the present invention, greater system thermal efficiencies are attained by reducing gas circulation fan energy. In thus enabling operation at more desirable operating temperatures, in the case of systems employing $CO_2$ refrigerant, the build-up of solid $CO_2$ otherwise had, is eliminated or substantially reduced. Because of the push-pull fan arrangement and the scroll case provision which reduces the cross-sectional area of the gas flow path, the volume of gas needed to be circulated to achieve the desired velocity across the product is markedly decreased and the velocity energy of the gas stream conserved, thereby affording a higher average gas velocity for contact of the heat exchange fluid and product.

Moreover, by confining the heat exchange gas circulation to a well defined circuit, the transfer of heat from the recirculating gas to potentially solid $CO_2$ is improved, thereby allowing injection of the liquid $CO_2$ refrigerant at the proper gas temperature point in this circuit, where the gas/solid temperature difference is high enough to completely sublime the nucleate snow. By locating a number of refrigerant injection points circumferentially around the circuit, a low temperature isothermal system is approached incrementally without sacrificing the temperature differential required to effect complete sublimation of $CO_2$ snow. In addition, by locating the liquid $CO_2$ injection orifice directly in the recirculating gas stream and so positioned that the refrigerant injection blast is against the direction of the recirculating gas stream, further control over snow sublimation is achieved, since the nucleate snow particles are thus stripped of the accompanying cold-gas envelope, exposing them to the warmer circulating gas stream before they coalesce into larger particles with lower surface to volume ratios.

The system of the present invention, employing the push-pull fan arrangement and flow path restricting scroll case, results in considerable reduction in the volumetric flow rate of the recirculating gas needed to maintain the desired average velocity, as compared to previously known spiral gas recirculating systems. One such known system employs a center cage consisting of a perforated drum which is pressurized by the gas recirculating fan or fans and causes the cold gas to blow out radially across the warm product. In such arrangement the velocity would be directed into the enclosure walls where it would be lost and solid $CO_2$ can build up. In a second known arrangement, such as that disclosed for example in U.S. Pat. No. 3,733,848, the gas flow is confined only by the enclosure walls, allowing substantial leakage flow outside the product zone, thereby reducing gas velocity and permitting solid $CO_2$ build-up. A comparatively large number of fans are required to provide the desired average gas flow velocity across the entire product zone. In using tangential or inline type linear flow blowers to cover more area in this arrangement, there is a further increase in required energy by trading the more efficient propeller-type fan for a less efficient fan.

On the other hand, by the scroll arrangement featured in the present invention, in addition to the attained reduction in volumetric gas flow rate necessary to maintain the desired average velocity, the gas is essentially confined within the product zone, such that in systems employing liquid $CO_2$ refrigerant any solid $CO_2$ that may be formed is confined to such product zone where it can sublime. By incorporating two fan banks in a series of push-pull arrangement within a properly designed scroll casing, the angular momentum induced helps direct the gas velocity around the product zone to the suction of the opposite fan bank as contrasted to previous arrangements.

Moreover, the arrangement of the fans in accordance with the invention whereby the heat exchange fluid is projected essentially directly into the path of the products travelling on the conveyor, the spurting of such heat exchange fluid at comparatively high velocity through the ports at the product inlet and discharge stations is avoided. The low velocity leak of a small portion of the heat exchange fluid at these ports in the system of the invention, however, is sufficient to establish a counterflow barrier against significant influx of external air into the area enclosed by the insulated housing.

As is common in installations of the type described employing $CO_2$ refrigerant, provision is made to prevent undesired leakage of the $CO_2$ into the atmosphere at the product inlet and outlet of the heat exchange system. Thus, exhaust ducts (not shown) may be provided adjacent to product inlet 19 and outlet 20 to draw off the $CO_2$ there leaking out, these ducts being connected to a venting conduit provided with an exhaust blower.

While in the preferred embodiment illustrated and above described, the drum or cage is disclosed as made up of a plurality of spaced vertical bars 26, in some instances if desired, the circumferential wall of the drum or cage may be solid or a solid curtain may be attached to the inside or outside faces of these bars. Such solid wall formation is not recommended for systems designed for handling of food products and the like in which sanitation needs to be considered.

What is claimed:

1. In a heat exchanger comprising an insulating housing having an inlet and an outlet, a horizontally rotating drum positioned in a supporting framework within said housing, conveyor means in the form of a continuous flat belt winding around the circumferential wall of said drum and defining a vertical helical path between said inlet and said outlet for passage of product through said housing, means for changing the temperature of circulating heat exchange fluid within said housing, wherein said drum is rotatively driven by a central drive shaft within said drum; the improvement which comprises a supporting superstructural framework positioned externally over the roof of said insulating housing; bearing means mounted in said superstructure; the drive shaft for said drum extending through the roof of said housing and being journaled in said bearing; mechanical means connected go the shaft extension outside said housing for rotating said shaft; said supporting framework within said housing has mounted therein at at least two diagonally opposed positions thereof a bank of axial flow fans blowing inwardly along said helical path of travel of said conveyor belt, each such bank comprising at least two fans; said means for changing the temperature of said circulating heat exchange fluid comprises a fluid discharge nozzle positioned adjacent each fan for discharging liquid refrigerant into the fan blast in a direction counter to that of the blast to effect rapid vaporization of said refrigerant; scroll means provided at each bank of fans to confine the path of heat exchange fluid movement propelled by said fans, said scroll means extending continuously from a position adjacent the periphery of the helix formed by said belt around the rotating drum and extending at least part of the way along the outer periphery of said belt, thereby causing said heat exchange fluid to flow along the path of said belt for a substantial part of its flow distance from the discharge side of one bank of fans to the intake of a second bank of fans where the negative pressure of said second bank exits.

2. The improvement as defined in claim 1 wherein said bearing means mounted in said superstructure framework is a radial-thrust bearing from which the drive shaft is suspended.

3. In a heat exchanger comprising an insulating housing having an inlet and an outlet, a horizontally rotating drum positioned in a supporting framework within said housing, conveyor means in the form of a continuous flat belt winding around the circumferential wall of said drum and defining a vertical helical path between said inlet and said outlet for passage of product through said housing, means for changing the temperature of circulating heat exchange fluid within said housing, wherein said drum is rotatively driven by a central drive shaft within said drum; the improvement which comprises having mounted in said supporting framework within said housing at at least two diagonally opposed positions thereof a bank of axial flow fans blowing inwardly along said helical path of travel of said conveyor belt, each such bank comprising at least two fans; said means for changing the temperature of said circulating heat exchange fluid comprises a fluid discharge nozzle positioned adjacent each fan for discharging liquid refrigerant into the fan blast in a direction counter to that of the blast to effect rapid vaporization of said refrigerant; scroll means provided at each bank of fans to confine the path of heat exchange fluid movement propelled by said fans, said scroll means extending continuously from a position adjacent the periphery of the helix formed by said belt around the rotating drum and extending at least part of the way along the outer periphery of said belt, thereby causing said heat exchange fluid to flow along the path of said belt for a substantial part of its flow distance from the discharge side of one bank of fans to the intake of a second bank of fans where the negative pressure of said second bank exits.

* * * * *